(12) United States Patent
McIver et al.

(10) Patent No.: US 8,334,007 B2
(45) Date of Patent: Dec. 18, 2012

(54) CONTINUOUS PROCESS FOR THE INCORPORATION OF A FLAVOR OR FRAGRANCE INGREDIENT OR COMPOSITION INTO A CARBOHYDRATE MATRIX

(75) Inventors: Robert Clark McIver, Tabernacle, NJ (US); Jean-Paul Leresche, Onex (CH); Bessaa Neffah, Plan-les-Ouates (CH)

(73) Assignee: Firmenich SA, Geneva (CH)

( * ) Notice: Subject to any disclaimer, the term of this patent is extended or adjusted under 35 U.S.C. 154(b) by 1724 days.

(21) Appl. No.: 10/390,905

(22) Filed: Mar. 19, 2003

(65) Prior Publication Data
US 2004/0185159 A1 Sep. 23, 2004

(51) Int. Cl.
*A23L 1/22* (2006.01)
(52) U.S. Cl. .................. 426/650; 426/524; 426/660
(58) Field of Classification Search .................. 426/658, 426/660, 516, 518, 520, 524, 650, 651
See application file for complete search history.

(56) References Cited

U.S. PATENT DOCUMENTS

| | | | | |
|---|---|---|---|---|
| 3,633,664 | A | | 1/1972 | Walsh |
| 3,704,137 | A | * | 11/1972 | Beck .............................. 426/651 |
| 3,955,617 | A | | 5/1976 | Walsh ............................. 165/94 |
| 4,073,339 | A | | 2/1978 | D'Orsay ......................... 165/94 |
| 4,610,890 | A | | 9/1986 | Miller et al. ................... 426/651 |
| 4,707,367 | A | | 11/1987 | Miller et al. ..................... 426/96 |
| 5,518,067 | A | | 5/1996 | Finch et al. ...................... 165/92 |
| 5,709,895 | A | * | 1/1998 | Tanaka et al. .................... 426/96 |
| 6,432,460 | B1 | * | 8/2002 | Zietlow et al. ................... 426/74 |

FOREIGN PATENT DOCUMENTS
WO WO 01/74178 A1 10/2001

* cited by examiner

*Primary Examiner* — Kelly Bekker
(74) *Attorney, Agent, or Firm* — Winston & Strawn LLP

(57) ABSTRACT

The invention relates to a continuous process for the preparation of a flavor or fragrance delivery system, wherein the presence of two heat exchangers operating respectively an evaporation and cooling step, allow to optimize the quality and yield of the final product.

20 Claims, No Drawings

CONTINUOUS PROCESS FOR THE INCORPORATION OF A FLAVOR OR FRAGRANCE INGREDIENT OR COMPOSITION INTO A CARBOHYDRATE MATRIX

BACKGROUND OF THE INVENTION

The present invention relates to the field of encapsulation. It concerns more particularly the improvement, in terms of cost of processing and profitability, as well as in the final product quality, of known processes relating to the incorporation of a volatile ingredient or composition such as a flavor or fragrance compound, into a carbohydrate based matrix. The invention specifically relates to a process for the preparation of a solid flavor or fragrance particulate composition comprising the preparation of an aqueous solution of carbohydrate material, the evaporation of water from said solution, the emulsification of a flavor or fragrant ingredient or composition in the obtained concentrated solution, the cooling of the mixture, its extrusion into a cold organic solvent and finally the drying of the particulate composition there obtained. The process of the invention is characterized first of all by the fact that it is completely effected in a continuous manner, and secondly by the use of two heat exchangers for carrying out the evaporation on the one hand, and the cooling step on the other.

Encapsulation techniques are widely used, in particular in the flavor and fragrance industries, to alleviate problems caused by the volatility and lability of this kind of active ingredients. In fact due to the nature of the latter, losses of volatile components might occur during storage or processing, prior to incorporation of these actives in a final consumer product. Moreover, encapsulation of active ingredients is also used to ensure their proper and controlled release from a matrix system.

It is not surprising therefore to observe that, in order to reduce or eliminate the stability or release problems associated with volatile and labile flavor or fragrance components, various attempts have been made to encapsulate such ingredients in carbohydrate matrices, so as to reduce their volatility or lability. This results in the preparation of stable free flowing powders containing flavor or fragrance ingredients or compositions for subsequent flavor or fragrance release when the particles thus obtained are incorporated into a final consumer product or when such a product is eventually consumed.

The prior art has therefore developed a number of techniques for producing, in particular in the flavor industry, solid essential oil particulate compositions. Amongst these techniques, extrusion methods typically rely on the use of carbohydrate materials constituting the matrix, which are heated to a molten state and combined with essential oils or flavor ingredients, before being extruded and finally quenched to form a glass which protects the flavor.

One significant example of the prior art disclosure in this field is U.S. Pat. No. 3,704,137 which describes an essential oil composition formed by mixing an oil with an antioxidant, separately mixing water, sucrose and hydrolysed cereal solids with DE below 20, emulsifying the two mixtures together, extruding the resulting mixture in the form of rods into a solvent, removing the excess solvent and finally, adding an anti-caking agent.

Another, more pertinent example in the context of the invention is that of U.S. Pat. Nos. 4,610,890 and 4,707,367 which describe a process for preparing a solid essential oil composition having a high content of essential oil, which composition is prepared by forming an aqueous solution containing sugar, a starch hydrolysate and an emulsifier. The essential oil is blended with the aqueous solution in a closed vessel under controlled pressure to form a homogeneous melt, which is then extruded into a relatively cold solvent, dried and combined with an anti-caking agent.

More recently, PCT published application WO 01/74178 also discloses a process for the preparation of an encapsulated flavor composition comprising boiling the matrix ingredients, then heating to reduce the moisture content of the mixture, cooling before adding a flavor to be encapsulated and finally further cooling to solidify the encapsulated flavor before particulating said encapsulated flavor.

These patents are merely illustrative of the considerable volume of patent literature related to the fixation of flavor or fragrance ingredients in various matrices, in particular by way of extrusion, and in essence these documents all disclose encapsulation processes carried out in batch conditions. Consequently, these prior art processes, comprising in particular mixing and extrusion steps present important drawbacks, which it would be useful to eliminate. In fact, batchwise conditions are synonymous of inhomogeneous reaction conditions, thus providing varying qualities and yields in the obtained products. More particularly, mixing steps carried out in batch conditions take some time and may therefore generate degradations and volatilization of certain volatile components. In this context, one can note that U.S. Pat. No. 4,707,367 for example specifies that a high percentage of essential oil or oil-soluble flavor is initially added in the process there-described to accommodate oil losses, for example during emulsification and solvent washing of the product. Moreover, extrusion steps, when effected as an intermittent operation, cannot be effected in production scale. Finally, batch conditions do not allow to control accurately the physical parameters such as the temperature during a process.

U.S. Pat. No. 5,709,895 which again relates to the preparation of flavor-containing capsules, discloses a process comprising the steps of heating a carbohydrate mixture, then adding a flavor to that mixture, and solidifying the latter by rapidly cooling it under extrusion. It is mentioned in that document that a series of operations can be continuously carried out in a single container. More particularly, heating, mixing and extrusion can be performed in an extruder, made of a pressure container, and which is provided with two or more screws. The carrying out of these three operations, namely heating, mixing and extruding in a single piece equipment, prevents from controlling accurately the process parameters such as the temperature. Furthermore, the process there-described specifies that the water content of the initial mixture must be keep to a minimum, in order to avoid a prolonged heating time required to lower the moisture content of the carbohydrate mixture. The prior art document here-cited emphasizes the problem often encountered and which is associated with the time of heating exposure of the molten mass, responsible for losses of active ingredients. Yet, the problem is not solved in an efficient manner in this prior art document. In fact, the use of a minimum of water there-claimed increases the viscosity of the mixture and thus necessitates apparatus capable of extruding highly viscous media, such as twin screw extruders, which are of course very costly.

In view of these prior art documents, there is clear need for an improved method for producing flavor or fragrance-containing capsules or particles, wherein the losses of active ingredient occurring during mixing, extrusion or yet heating steps of the process are kept to a minimum, while allowing a simple and cost-effective extrusion.

SUMMARY OF THE INVENTION

Now, surprisingly, we have been able to overcome the drawbacks encountered in the prior art by providing a process for the encapsulation of an active ingredient, further referred to as "active", namely a flavor or fragrance ingredient or composition comprising the preparation of an aqueous solution of at least one carbohydrate material constituting the base of the matrix, the concentration of said solution, the emulsification of an active ingredient therein, the cooling of the mixture, its extrusion into a cold solvent and finally, the drying of the obtained particulate composition. The process is characterized by the fact that it is entirely carried out in a continuous manner and by the presence, in the continuous layout of the process, of two heat exchangers providing for, on the one hand, the evaporation of water during the concentration of the aqueous solution of carbohydrate material, and on the other hand the cooling of the mixture of carbohydrate and active ingredient to be extruded. The presence of the first heat exchanger allows an accurate concentration of an aqueous solution while maintaining the mean residence time of the solution in the heat exchanger to a minimum, so as to reduce the damages on carbohydrate constituents of the matrix. On the other hand, the second heat exchanger provides an accurate way to cool down the mixture of carbohydrate and active ingredient to the desired extrusion temperature, thus providing at the end of the process a product which is more uniform in terms of flavor or fragrance retention and in particular as regards volatile materials. Furthermore, an accurate control of the extrusion temperature allows to better control the size distribution of the particulate composition finally obtained.

DETAILED DESCRIPTION OF THE PREFERRED EMBODIMENTS

The present invention will now be described in greater detail.

The invention concerns a process for the preparation of a solid flavor or fragrance particulate composition comprising the steps of a) preparing an aqueous solution of at least one carbohydrate material to form a syrup; b) heating the syrup to form a concentrated solution or candy; c) uniformly dispersing an active flavor or fragrance ingredient or composition throughout the candy to form a candy-active mixture; d) cooling the candy-active mixture to a temperature to which it is in a molten state; e) extruding the molten mixture into a cool organic solvent wherein the extruded molten mass is broken up into particulate composition; and f) drying the particulate composition, wherein steps a) to f) are carried out continuously, and wherein steps b) and d) are carried out by passing the syrup in step b), respectively the candy-active mixture in step d), onto the surface of a heat-exchanger.

A continuous process means a computer controlled process, by opposition to a batch process, wherein all operations are manual. Essentially, the different processing steps of the process of the invention are each carried out by different pieces of equipment which, when appropriately sized and connected together, are combined to make a continuous process. The latter allows to accurately control the process variables, in particular the extrusion temperature, and therefore to provide a final product of consistent quality. Moreover, the process of the invention, compared with a similar batch one, allows to lower the cost of manufacture of the final product, for larger volumes produced. Practically, while the batch conditions disclosed in the process from the prior art, such as that described in U.S. Pat. No. 4,707,367, allow to encapsulate at most about 75 to 80% by weight of the quantity of oil combined and emulsified in the matrix, the process of the present invention allow to effectively encapsulate more than 90% of the active ingredient combined with the concentrated candy.

The process of the invention is characterized by the use in the evaporation (step b) and cooling (step d) steps of heat exchangers, with respectively swept and scraped surfaces.

A swept or scraped surface heat exchanger is basically made up of a cylinder with a finished inner surface, a rotor mounted approximately on the cylinder axis, and pins or other means carried by the rotor for mounting scraping or sweeping blades to continuously sweep or scrape depending on the direction of rotation of the rotor, layers of heated or cooled liquid from the inner cylinder wall, the heating or cooling being effected usually by a hot or cold medium in an annulus jacket surrounding the heat exchange cylinder. Such type of swept or scraped surface heat exchanger is disclosed for instance in U.S. Pat. No. 3,633,664. Optionally, there may be a passage for a second heat exchange to heat or cool the cylindrical outer surface of the rotor, as disclosed in U.S. Pat. No. 4,073,339, so that the product mass passing through the chamber in the jacketed cylinder can be heated or cooled from both the outside and the inside of the mass, simultaneously with the mixing of the mass by the action of scraper means.

Many other models of swept or scraped surface heat exchangers are described in the literature, for instance in U.S. Pat. No. 3,955,617 or 5,518,067 wherein the apparatus disclosed is particularly adapted to the heating or cooling of fluids having a certain viscosity. The present invention is not limited to one particular type of heat exchanger. Many types of apparatus commercially available suit the purpose of the present invention. Therefore, a more detailed description of the apparatus is not needed here, as this is well described in the literature and well known by a skilled person in the art.

The first heat exchanger used in the second step of the process of the invention is preferably a swept surface heat exchanger, and allows to evaporate water from the initial aqueous solution of carbohydrate material or syrup, to form a concentrated carbohydrate solution or candy. The presence of such a heat exchanger provides an efficient way to reduce the mean exposure residence time of the syrup, respectively candy, to heat. Therefore, contrary to the processes known up to date, the process of the invention advantageously reduces the possible damages due to heat over the carbohydrate constituent of the matrix. As a result, in the particular case where sucrose is present among the carbohydrate materials, risks of browning of the carbohydrates and off-flavor development are minimized. Moreover, in another particular case where the matrix would comprise gum materials, excess heat exposure is known to have a detrimental effect on emulsifying properties of the latter materials. Here again, such a drawback is avoided thanks to the process of the present invention.

On the other hand, the presence of the above-mentioned heat exchanger in the continuous process of the invention implies that the rate of feed of the syrup to the heat exchanger for evaporation is controlled, and as a consequence, the concentrated formed candy is uniform in color and flavor or fragrance. In the prior art disclosing batch processes, the variability in the evaporation stage could result in visual and flavor (from caramelization of the carbohydrates) differences between individual batches.

The second heat exchanger used within the framework of the present invention allows to cool down to an accurate and defined temperature in the fourth step of the process, the candy-active mixture (emulsion) which is going to be extruded. More particularly, a skilled person in the art is aware that, for a given combination of matrix materials, moisture and flavor or fragrance ingredient or composition, there is an optimum extrusion temperature. In fact, if the latter is too high, it could induce a de-mixing of the emulsion, resulting in low volatile content in the finished product, as well as degradation of low boiling components which could thus flash off as they exit the holes of the die. Besides, such temperature conditions would also provide a low active content in the final product, an alteration of the flavor or fragrance profile and a weakening of the strands of extruded product by an expansion of the strands exiting the die. On the other hand, if the extrusion temperature is too low, the mixture will be difficult to extrude due to a high viscosity and thus require higher pressure conditions to be extruded, which can lead to a poor control of the diameter of the strands exiting the die. This low temperature also results in long extrusion times which adversely impact throughput rates.

Now, in a typical extrusion batch process the temperature of extrusion is not a controlled parameter. In fact, although the temperature of the jacket of a vessel is set, it has only minor effects on the final temperature of the material prior to extrusion. The temperature of extrusion is determined primarily by the temperature of the concentrated candy, the temperature and quantity of the flavor or fragrance added, and the heat added from shearing the active ingredient to be encapsulated into the candy to form droplets (emulsification). In the process of the invention, however, after exiting the emulsifying unit, the candy-active mixture or emulsion passes through a heat exchanger, preferably a scraped surface heat exchanger, to cool the mixture to an accurate desired extrusion temperature, and this is not possible with batch processes. As a result, the product formed at the end of the process is advantageously more uniform in retention of active ingredient, in particular as regards the more volatile components. Besides, a better control of the extrusion temperature, allows to produce a particulate composition with a narrow size distribution, or in other words, to improve the control of the particle size.

Other aspects and advantages of the process of the invention will be disclosed in the detailed description and in the examples here below.

The first step of the process according to the invention is the preparation of an aqueous solution of at least one carbohydrate material, which solution is termed "syrup". As the carbohydrate material, there can be used any carbohydrate or carbohydrate derivative which can be processed through extrusion techniques to form a dry extruded solid. Particular examples of suitable materials include those selected from the group consisting of sucrose, glucose, lactose, levulose, fructose, maltose, ribose, dextrose, isomalt, sorbitol, mannitol, xylitol, lactitol, maltitol, pentatol, arabinose, pentose, xylose, galactose, hydrogenated starch hydrolysates, maltodextrin, agar, carrageenan, other gums, polydextrose, synthetic polymers such as polyvinyl alcohol, semi-synthetic polymers such as succinylated starch, cellulose ethers, proteins such as gelatin, and derivatives and mixtures thereof.

According to a particular embodiment of the invention, there will be used maltodextrin or mixtures of maltodextrin with at least one material selected from the group consisting of sucrose, glucose, lactose, levulose, maltose, fructose, isomalt, sorbitol, mannitol, xylitol, lactitol, maltitol and hydrogenated starch hydrolysates, preferably a maltodextrin having a dextrose equivalent not above twenty ($\leqq 20$) and more preferably a DE of 18.

The above mentioned carbohydrate materials are hereby given by way of example and they are not to be interpreted as limiting the invention. Although polysaccharides are mentioned above as specific examples, it is clear that any material which is extrudable and currently used as a matrix material in the production of extruded solids appropriate for flavor or fragrance applications is adequate for the aim of the invention and is therefore hereby included in the latter.

The aqueous solution or syrup prepared in the first step of the invention typically comprises from 12 to 40% by weight of water relatively to the total weight of the solution, preferably from 18 to 25% by weight.

The equipment wherein this first step is carried out consists of 3 supersack holders of carbohydrate ingredient with conveyors, namely a dry solid weight tank, a mixing tank equipped with a high shear mixer, and a heating tank equipped with mixing blade; a multitube heat exchanger and a pump to circulate the syrup through the heat exchanger. The three tanks are mounted above each other so that transfer of material from weight tank to mixing tank to heating tank is by gravity.

To prepare the syrup, a portion of the water is metered into the mixing tank. The carbohydrate material is conveyed to the dry solid weight tank until the desired quantity is reached. This material is dropped into the mixing tank containing water. A second portion of water is sprayed onto the top of the carbohydrate in the tank to aid in wetting and dispersion. This process is repeated when the matrix comprises more than one carbohydrate component. Also into this mixing tank, may be added other matrix ingredients such as pH modifiers, emulsifyers, gums or colorants, as required. For instance, suitable emulsifiers include sulfoacetates of mono- and diglycerides as well as polyglycerol esters, lecithin and modified lecithin. These emulsifiers are given by way of example but they are not to be interpreted as limiting the invention, as any emulsifier having a hydrophobic part and a hydrophilic part can be used within the framework of the invention. The contents of the mixing tank are mixed with high shear to form a homogeneous dispersion. The dispersion is further transferred by gravity to the heating tank located on the bottom. The dispersion is pumped from the tank through the multitude heat exchanger and back to the hot tank in a loop. The syrup is heated to about 60 to 80° C. to form a solution, preferably to 70 to 80° C. Once the syrup is heated to the desired temperature, it is pumped to a holding tank for concentration and further processing.

The continuous carrying out of this step of the process advantageously provides a syrup of uniform composition, especially as regards the solid percentage. This is important for producing a uniform product in the subsequent processing steps. Moreover, this way of proceeding ensures a complete solubilization of the carbohydrate material before concentration of the aqueous solution, thus avoiding problems due to the presence of small microscopic agglomerates of the carbohydrate, which could remain throughout the process, and which could adversely impact active ingredient encapsulation and the final product quality.

In the second step of the process, water is evaporated from the syrup to form a concentrated carbohydrate solution or candy. The moisture content of the candy after concentration varies according to the matrix composition and to the active ingredient quantity to be incorporated. Typically, the moisture of the candy varies between 2 and 11% by weight and preferably between 3.5 and 7% by weight relative of the total weigh of the concentrated solution.

Practically, the syrup obtained at the end of the first step is pumped from the holding tank through a swept surface heat exchanger in which the water is evaporated to achieved the desired moisture level in the candy. Typically, the temperature of the heat exchanger is comprised between 105 and 150° C. In a particular embodiment, it is comprised between 115 and 135°. This temperature will be set as a function of the matrix composition. The contents of the heat exchanger are discharged into a tank in which the evaporated water is vented to the atmosphere and the concentrated candy falls to the bottom of the tank. The presence of a heat exchanger in this step of the process characterizes the invention and advantageously allows, compared with a batch process, to reduce the time of exposure to heat which damages the materials exposed thereto. In a particular embodiment, the mean residence time of the syrup in the heat exchanger is comprised between 1 and 10 minutes. At the end of this step, the formed concentrated candy is uniform in color and flavor.

After the evaporation step, comes the emulsification step, wherein a flavor or fragrance ingredient or composition referred to as "active" is dispersed throughout the candy to form a candy-active mixture. The terms flavor or fragrance ingredient or composition as used herein are deemed to define a variety of flavor and fragrance materials of both natural and synthetic origin. They include single compounds and mixtures. The process of the invention may be employed to manufacture encapsulated volatile and labile components which may be in liquid or solid form, hydrophilic or hydrophobic. Specific examples of such components may be found in the current literature, e.g. in Perfume and Flavor Chemicals by S. Arctander, Montclair N.J. (USA); Fenaroli's Handbook of flavour Ingredients, CRC Press or Synthetic Food Adjuncts by M. B. Jacobs, van Nostrand Co., Inc. and are well-known to the person skilled in the art of perfuming, flavoring and/or aromatising consumer products, i.e. of imparting an odor or taste to a consumer product.

Natural extracts can also be encapsulated by the process of the invention. These include e.g. citrus extracts, such as lemon, orange, lime, grapefruit or mandarin oils, or coffee, tea, cocoa, mint, vanilla or essential oils of herbs and spices, amongst other.

It is well known that, for an effective encapsulation of an active ingredient in a delivery system, this active ingredient must be uniformly dispersed as small droplets throughout the matrix materials. Practically, according to the process of the invention, the concentrated candy obtained in the precedent stage of the process exits the tank at a fixed rate and is pumped through an on-line high shear homogenizer. Immediately before this homogenizing unit, the active ingredient is metered into the processing line at a fixed rate. Residence time in the homogenizing unit is less that 10 seconds. Consequently, compared with a batch process, the present invention advantageously allows to shorten the exposure time to high shear conditions. Since the action of high shear blades within a viscous matrix results in significant amount of heat generation due to friction, heat labile components can be damaged when the exposure to these mixing conditions is extended, inducing altered flavor or fragrance profiles and an off-flavor/fragrance development, as is the case in a batch process. These potential problems are avoided with the process of the invention. Moreover, the uniform rate of addition of active ingredient to a constant flow of candy of uniform moisture content, results in a consistent finished product, while individual batches of a classical process, can vary in moisture content and color from the evaporation stage resulting in differences in appearance and in flavor or fragrance encapsulation efficiency between batches.

As noted above, the emulsification step here-above described adds heat to the candy-active mixture which thus requires to be cooled in the next step to an optimized extrusion temperature. We have unexpectedly established that this can be achieved in an optimal way by means of a second heat exchanger. Therefore, after exiting the emulsification unit, the candy-flavor/fragrance emulsion passes through a heat exchanger, preferably a scraped surface heat exchanger to cool the mixture to a temperature optimized between the limits explained above. Typically, the extrusion temperature is comprised between 102 and 135° C., preferably between 112 and 130° C. The extrusion temperature is optimized as a function of the matrix compositions, and composition and level of flavour or fragrance material. A skilled person in the art is capable of defining this optimized temperature. The heat exchanger then allows to accurately reach this temperature in particular, and through this control, to provide an advantageously uniform product in terms of retention of active ingredient, as well as a better control of the final particulate composition size.

The extrusion step consists in forcing the molten mixture candy-active through the holes of the die, thus forming the strands of product which fall into an organic solvent bath. The control of the extrusion step is very important in product quality and yield. Most of the processes described up to now, in particular batch processes required high extrusion pressures, typically at least ranging from 2 to $7 \times 10^5$ Pa, which could induce a de-mixing of the phases (hydrophilic carbohydrate matrix and hydrophobic oil). In addition, at high extrusion pressures, the strands could expand upon exiting the die holes. Now, according to the present invention, the force for extruding is supplied by a pump operating at a fixed speed resulting in a constant extrusion rate. Typical extrusion pressures are, within the framework of the invention, in the range of 1 to $3 \times 05$ Pa. Therefore, thanks to these lower extrusion pressures, expansion of strand diameter at the exit of the die holes is avoided and a better uniformity of size can be obtained. Besides, de-mixing of phases is avoided. The total heat exposure time is uniform for all material produced and finally, the uniform extrusion rate advantageously results in uniform strand diameter.

The extruded strands fall into a chilled, agitated bath of an organic solvent, typically isopropyl alcohol. This provides for very rapid cooling to transform the molten strands into an amorphous glass. Within the bath, the strands are mechanically chopped to short particles. Also, the organic solvent washes residual flavor or fragrance residue from the surface of the particles. The slurry of particles and organic solvent is pumped to a centrifuge that separates the majority of the organic solvent from the particles. The particles with residual organic solvent are transferred to a dryer.

The final step of the process is the drying stage which aim is to remove the residual organic solvent from the particles to reduce their moisture content to the desired level. Once the particles have been dried, they are mixed with a free flow agent and sifted to meet size specification. In the process according to the invention, the particles from a centrifuge are dried and cooled in either a multiple tray type dryer or a fluid bed dryer with typical residence times of 2 hours or 45 minutes respectively. These dryers are given by way of example, as any known other type of continuous dryer also works fine.

Example

The invention will be now described in a more detailed manner by way of example, wherein the temperatures are indicated in degrees Celsius, and the abbreviations have the usual meaning in the art.

Example

Process According to the Invention

A syrup solution of the following composition:

| Ingredients | Parts by weight |
|---|---|
| Sucrose | 40 |
| Maltodextrin 18DE | 40 |
| Water | 20 | was pumped at 80° into the first heat exchanger, at a rate of 8.0 kg/min.

Steam (approximately at 150°) was supplied to the jacket of a heat exchanger to evaporate water from the syrup. Steam temperature and flow rate were regulated to give the desired moisture content after evaporation. Residence time in the heat exchanger was of 2 min.

The concentrated syrup plus water exited the heat exchanger into a tank were the water vapor was removed. The melt was there about 6% moisture content and 127°.

A pump removed the melt from the tank and a flavor oil (mixture of 96 parts cold pressed orange oil, 4 parts lecithin) was injected into the processing line at a rate of 1.5 kg/min.

The mixture of melt and flavor oil passed for 10 s through an in-line high shear mixer to form an emulsion.

The emulsion passed through the second heat exchanger to cool to a temperature of 120° as measured at the exit of the heat exchanger. The temperature of the media (hot water) flowing through the jacket of the heat exchanger was regulated to achieve the exit temperature of the emulsion. The product then passed through the extrusion die, into a cold isopropanol bath. After impact breaking, of the filaments, the particles there-obtained were dried in a fluid bed dryer with a residence time of 45 min.

The particles obtained contained 16.8% by weight of orange oil and 4% by weight of moisture, relative to the total weight of a particle, and 95% of the initially combined cold pressed oil, was found to be in an encapsulated form at the end of the process.

What is claimed is:

1. A continuous process for the preparation of a solid flavor or fragrance particulate composition comprising the steps of:
   a) preparing an aqueous solution of one carbohydrate material to form a syrup;
   b) heating the syrup to a first temperature to form a concentrated solution of candy;
   c) adding an active flavor or fragrance ingredient or composition at a uniform rate to a constant flow of candy of uniform moisture content to form a candy-active mixture;
   d) cooling the candy-active mixture from the first temperature to a second, lower temperature that maintains the mixture in a molten state for extrusion;
   e) extruding the molten mixture at the second temperature into a cool organic solvent wherein the extruded molten mass is broken up into particles; and
   f) drying the particles;
   wherein steps a) to f) are carried out continuously and sequentially and steps b) and d) are carried out by passing the syrup in step b) and respectively the candy-active mixture in step d) across a heat-exchanger surface, wherein step e) directly follows step d).

2. The process according to claim 1, wherein step b) is carried out on a swept surface heat exchanger.

3. The process according to claim 1, wherein the syrup is heated in step b) to a temperature of between 105 and 150° C.

4. The process according to claim 2, wherein the mean residence time of the syrup in the heat exchanger in step b) is between 1 and 10 min.

5. The process according to claim 1, wherein the aqueous solution of step a) contains from 12 to 40% by weight of water relative to the total weight of the solution.

6. The process according to claim 1, wherein the aqueous solution of step a) is prepared by conveying starting materials from a dry solid weight tank to a mixing tank and a heating tank, and then pumping from the heating tank through a multitube heat exchanger and back to the hot tank in a continuous loop.

7. A process according to claim 1, wherein the candy at the end of step b) has a moisture content of between 2 and 11% by weight.

8. A process according to claim 1, wherein step c) is carried out by means of a high shear homogenizer wherein the mixture has a residence time of less than 1 min.

9. A process according to claim 1, wherein at least 90% by weight of the flavor or fragrance ingredient or composition dispersed through the candy in step c) is-encapsulated in the prepared particulate composition.

10. A process according to claim 1, wherein the extrusion step is carried out at a pressure of between $1 \times 10^5$ Pa and $3 \times 10^5$ Pa.

11. A continuous process for the preparation of a solid flavor or fragrance particulate composition comprising the steps of:
   a) preparing an aqueous solution of one carbohydrate material to form a syrup;
   b) heating the syrup to a first temperature of between 105 and 150° C. on a swept surface heat exchanger to form a concentrated solution of candy;
   c) adding an active flavor or fragrance ingredient or composition at a uniform rate to a constant flow of candy of uniform moisture content to form a candy-active mixture;
   d) cooling the candy-active mixture from the first temperature to a second temperature that maintains the mixture in a molten state, by introducing the mixture into a scraped surface heat exchanger that is maintained at the second temperature, wherein the mean residence time of the syrup in the heat exchanger in step b) is between 1 and 10 min;
   e) extruding the molten mixture at the second temperature into a cool organic solvent wherein the extruded molten mass is broken up into particles having a size distribution; and
   f) drying the particles;
   wherein steps a) to are carried out continuously and sequentially, and wherein step e) directly follows step d).

12. The process according to claim 11, wherein the aqueous solution of step a) contains from 12 to 40% by weight of water relative to the total weight of the solution.

13. The process according to claim 12, wherein the aqueous solution of step a) is prepared by conveying starting materials from a dry solid weight tank to a mixing tank and a heating tank, and then pumping from the heating tank through a multitube heat exchanger and back to the hot tank in a continuous loop.

14. A process according to claim 11, wherein the candy at the end of step b) has a moisture content of between 2 and 11% by weight.

15. A process according to claim 11, wherein step c) is carried out by means of a high shear homogenizer wherein the mixture has a residence time of less than 1 min.

16. A process according to claim 11, wherein at least 90% by weight of the flavor or fragrance ingredient or composition dispersed through the candy in step c) is encapsulated in the prepared particulate composition.

17. A process according to claim 13, wherein the extrusion step is carried out at a pressure of between $1 \times 10^5$ Pa and $3 \times 10^5$ Pa.

18. A process according to claim 1, wherein all operations are carried out continuously by a computer.

19. A process according to claim 11, wherein all operations are carried out continuously by a computer.

20. A continuous process for the preparation of a solid flavor or fragrance particulate composition consisting essentially of continuously and sequentially carrying out the steps of:
   a) preparing an aqueous solution of one carbohydrate material to form a syrup;
   b) heating the syrup to a first temperature of between 105 and 150° C. on a swept surface heat exchanger to form a concentrated solution of candy;
   c) adding an active flavor or fragrance ingredient or composition at a uniform rate to a constant flow of candy of uniform moisture content to form a candy-active mixture;
   d) cooling the candy-active mixture from the first temperature to a second temperature that maintains the mixture in a molten state, by introducing the mixture into a scraped surface heat exchanger that is maintained at the second temperature, wherein the mean residence time of the syrup in the heat exchanger in step b) is between 1 and 10 min;
   e) extruding the molten mixture immediately after cooling to the second temperature, with the extruding being made into a cool organic solvent wherein the extruded molten mass is broken up into particles having a size distribution; and
   f) drying the particles to form the solid flavor or fragrance particulate composition.

* * * * *